Jan. 20, 1959 W. C. EAVES 2,869,166
HEATING OR DEICING UNIT FOR GLAZED WINDOWS
Filed April 12, 1956 2 Sheets-Sheet 1
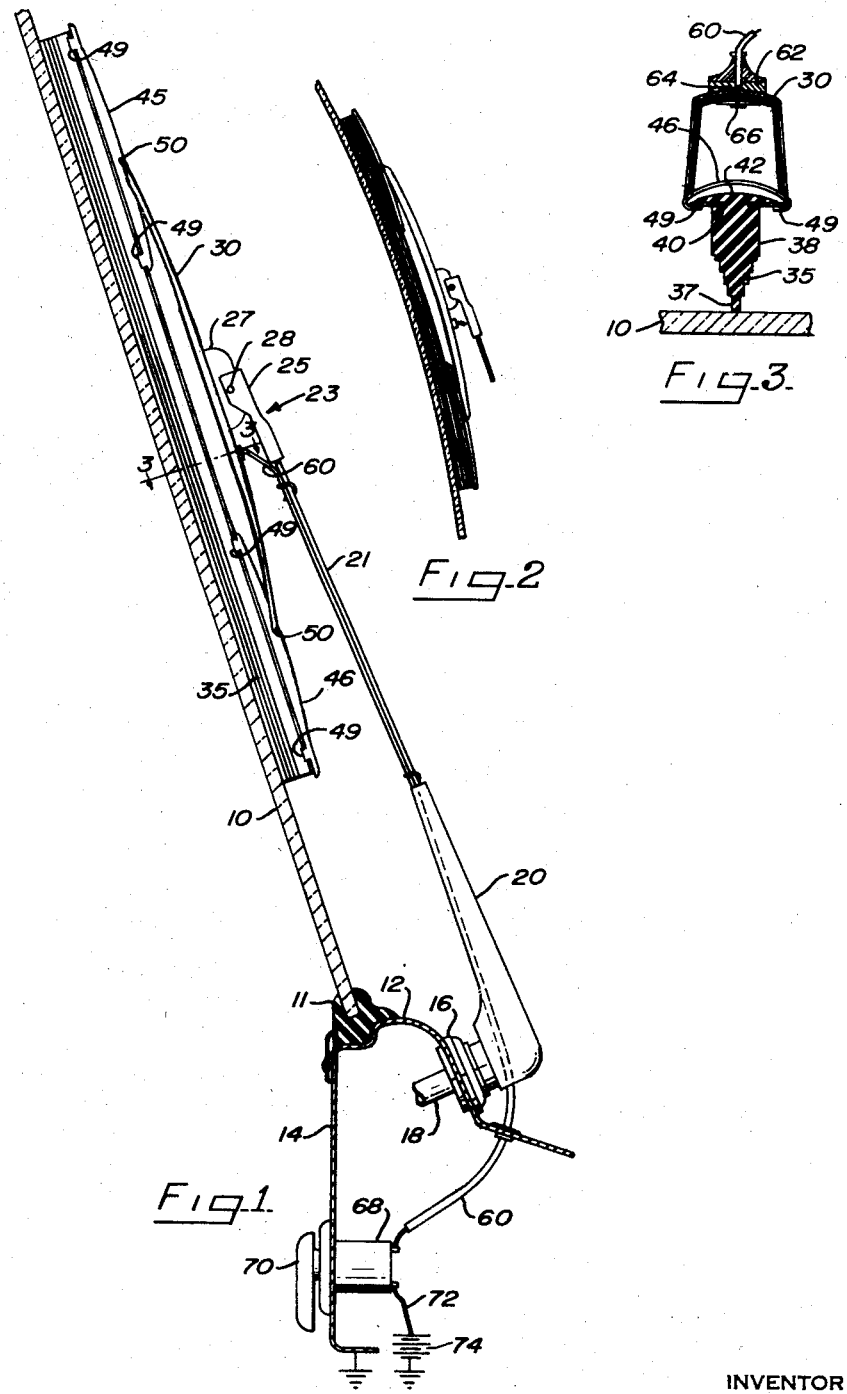
INVENTOR
WILLIAM C. EAVES
BY
Harry O. Ernsberger
ATTORNEY

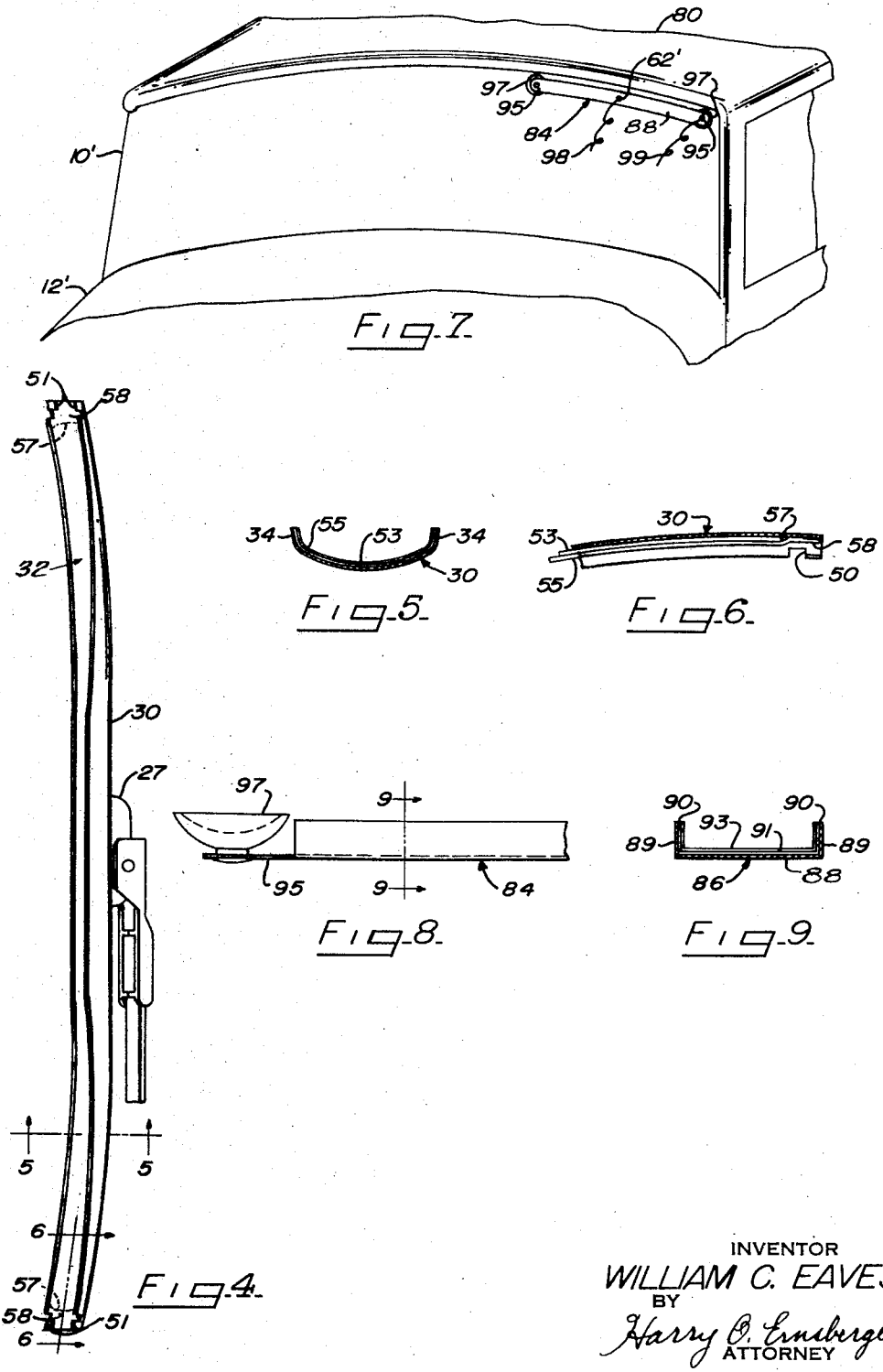

United States Patent Office 2,869,166
Patented Jan. 20, 1959

2,869,166

HEATING OR DEICING UNIT FOR GLAZED WINDOWS

William C. Eaves, Lakewood, Ohio

Application April 12, 1956, Serial No. 577,689

2 Claims. (Cl. 15—250.5)

This invention relates to devices or heating units for use in conjunction with vehicle windshields, windows or other glazing to facilitate the removal or eradication of ice which may collect upon the glazing.

A major hazard which makes winter or cold climate operation of automotive vehicles difficult is the accumulation of snow and ice on the vehicle windshield and other windows. The same problem is presented with aircraft operating in temperatures below freezing. Various means have been heretofore devised for the purpose of melting or removing ice and snow through the use of electrically energized heating means and some of these devices have been used, although comparatively expensive.

Devices have been constructed which embody electrically energized resistance units in conjunction with a windshield wiper or squeegee supporting means to effect a transference of heat from the unit to the zone ambient the wiper blade to melt the ice or snow collected upon the blade, the devices being arranged whereby the water resulting from the melting ice tends to flow over the ice collected on the windshield or window to melt or soften the ice so that the moving wiper will remove the water and the ice or snow loosened thereby.

One such device forms the subject matter of my Patent 2,627,011 granted January 27, 1953. In the type of unit forming the subject matter of this patent, a suitable resistance unit formed of resistance wire supported upon an insulating core or constructed in tubular form is supported by the windshield wiper construction. This form of unit, while satisfactory in removing accumulated ice from a windshield, is of appreciable size and bulk and increases the weight of the windshield wiper or squeegee construction.

It is desirable that the weight of a wiper blade or squeegee construction be kept as low as possible so that the tension of the resilient biasing means exerted against the wiper arm assembly may be rendered effective to hold the cleaning blade in close contact with the glass or the surface being cleaned.

Heating elements of this character require effective fastening means and such fastening means necessarily includes additional parts and hence extra weight and mass, placing additional load or burden upon the actuating means for the window cleaning device. Furthermore the heating element should be mounted as closely as possible to the metal portion of the squeegee in order to concentrate as much heat as possible onto the metal components of the unit in order to minimize loss or waste of heat energy.

Another factor affecting the design of heating element for use with a windshield cleaning device is the tendency in vehicle design toward the use of windshields of extreme curvature, augmenting the difficulties in providing heating means adaptable for use with a wiper construction embodying several metal bars or elements making up a satisfactory squeegee construction for operation on a curved glazed surface.

The present invention embraces the provision of a heater or deicing unit especially adapted for use with glazed members or surfaces for melting accumulated ice and snow wherein the heating element or component may be disposed very close to the supporting means to obtain an efficient and effective concentration and reflection of heat onto the glazed member or surface.

Another object of the invention resides in the provision of an effective unit adaptable for deicing of glazed surfaces wherein an electrically energizable resistance heater is in the form of a coating on a suitable support disposed near or adjacent a glazed surface and which may be relatively movable for the purposes of melting ice or snow accumulating on the glazed surface.

Another object of the invention resides in a heating unit of the electrically energizable resistance type in the form of a metal-bearing resistance coating composition which may be readily applied to a support and which occupies a comparatively large area as a coating and has no appreciable weight, mass or thickness compared to the extensive or large surface area presented for effective heat transfer purposes.

Another object of the invention embraces the provision of a so-called printed type electrically energizable resistance component which may be readily applied to a metal support or bar adapted to be disposed adjacent a glazed surface or which may be readily applied to the metal backing plate or supporting means of a windshield cleaner of the movable squeegee type without the use of mechanical fastening means and with a minimum of current conductors and circuit connections.

Another object of the invention embraces a resistance heating unit in the form of a current conducting coating applied to a support wherein the amount of heat generated and the temperature may be readily varied and controlled by modifying the proportions of the metal component and other materials making up the resistance unit coating or by varying the thickness of the applied coating.

Another object of the invention resides in a heating unit or component which may be applied as a coating or layer to the metal plate or support of a conventional windshield cleaner of the squeegee type without necessitating any modification or change of the squeegee construction or the addition of any parts or components other than insulating and current conducting coatings or layers.

Still another object of the invention resides in the use of a current conducting resistance coating which may be quickly and inexpensively applied by unskilled labor to a squeegee support or other member.

Still a further object embraces the provision of a resistance heating unit in the form of a coating or layer wherein the amount of heat adjacent the heating unit may be varied or controlled by modifying the thickness of the coating dependent upon the temperatures of the geographical regions in which the heating units are to be used.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of forms of the invention, which may be preferred, in which:

Figure 1 is a vertical sectional view through a vehicle windshield and mounting therefor illustrating a relatively movable windshield cleaner or squeegee mechanism embodying a form of heating unit of the invention;

Figure 2 illustrates the windshield cleaner arrangement shown in Figure 1 illustrating its conformation to a curved glazed surface or windshield for cleaning the same;

Figure 3 is an enlarged transverse sectional view taken substantially on the line 3—3 of Figure 1;

Figure 4 is an isometric view of the primary yoke or supporting bar of the construction shown in Figure 1 illustrating the resistance coating or layer applied thereto;

Figure 5 is an enlarged transverse sectional view taken substantially on the line 5—5 of Figure 4;

Figure 6 is an enlarged sectional view taken substantially on the line 6—6 of Figure 4;

Figure 7 is an isometric view of the forward portion of a vehicle body illustrating the arrangement of the invention in the form of a relatively stationary unit heater;

Figure 8 is a top plan view of a portion of the heating unit illustrated in Figure 7, and Figure 9 is an enlarged transverse sectional view taken substantially on the line 9—9 of Figure 8.

While I have illustrated the forms of the heating unit of the invention as embodied in both relatively stationary and movable heating units especially configurated for melting ice and snow from the windshield or windows of an automotive vehicle, it is to be understood that I contemplate the utilization of the invention with any arrangement for the purpose of melting ice or snow from various forms of glazing or glazed surfaces such as the windows of busses, railway cars, aircraft, watercraft and the like and which may be used on the interior of glazed surfaces to prevent or eliminate window fogging resulting from differential temperatures adjacent the inside and outside surfaces of a window.

Referring to the drawings in detail and first with respect to the arrangement shown in Figure 1, there is illustrated a vehicle windshield or glazed surface 10 suitably supported in a flexible rubber grommet or other weatherstrip member 11 surrounding the windshield 10 and supported at its lower horizontal zone by a cowl portion 12 of the vehicle body which is connected with an instrument panel 14 disposed interiorly of the vehicle body.

Mounted upon the cowl portion 12 is a suitable fitting or bearing support 16 in which is journalled an operating shaft 18 adapted to be oscillated by a suitable power actuated means (not shown). The shaft 18 supports a movable window cleaning device or squeegee arrangement as shown in Figures 1 and 2. Secured to and mounted on the shaft 18 is an arm 20 equipped with a rod-like extension or bar 21 which is connected to and supports the wiper, squeegee or cleaner construction.

The rod-like extension 21 is adapted for interlocking engagement in a socket formed in a member or clip 23. The member, clip or bracket 23 is formed with a U-shaped portion, the sidewalls 25 thereof straddling a member 27, the sidewalls being pivotally or articulately connected with the member 27 by a pin 28 or other suitable means. The member 27 is secured to the central zone of a primary frame member, bar or yoke 30 formed of metal of the windshield wiper or cleaner construction.

The primary frame member or bar 30 in the embodiment illustrated is of channel or generally U-shape cross section having a bight portion or central zone 32 and spaced parallel wall portions 34 extending in the same direction from the flat central zone 32 of the member 30. The primary member or bar may be flat or of other suitable cross section. The windshield wiper or cleaner construction is inclusive of a cleaner, wiper or squeegee element 35 formed with a comparatively thin window or glazed surface engaging portion 37 integrally formed with a body portion 38.

The squeegee element 35 is preferably formed of molded rubber and as particularly shown in Figures 1 and 3, is molded around or embraces a thin flexible metal plate 40 which has longitudinally-spaced central openings through which the rubber or other material of the squeegee flows during the molding operation, forming an enlarged longitudinally extending head portion 42 overlapping the edges of the metal plate 40 in the manner shown in Figure 3. The metal plate or reinforcement 40 is made very thin preferably about twenty thousandths of an inch in thickness so as not to impair the flexibility of the squeegee in accommodating the same to curved portions of the windshield in the manner shown in Figure 2.

As particularly shown in Figures 1 and 2, the squeegee frame construction embodies metal secondary yokes, frame members or bars 45 and 46 which are preferably of identical construction. The end zones of each of the secondary frame members 45 and 46 are provided with ears projecting portions 49 which are bent around the outer edge zones of the flexible plate 40 as shown in Figures 1 and 3.

The central zones of each of the secondary frame members 45 and 46 are formed with openings 50 into which extend projecting portions 51 formed at the end zones of the primary frame bar or yoke 30 as shown in Figure 1. Thus through articulation of the extremities of the bar 30 with the secondary yokes or bars 45 and 46, the squeegee 35 and the thin reinforcing plate 40 are substantially free to conform to the regions of varying curvature of a windshield or glazed surface as illustrated in Figure 2.

During oscillation of the shaft 18, the arm 20, rod 21 and the squeegee assembly carried thereby move in an arc about the axis of the shaft 18, the squeegee being reciprocated in sweeping or cleaning strokes across the windshield or glazed surface in the conventional manner.

In the embodiment of the invention illustrated in Figures 1 through 6, the primary yoke, bar or member 30 forms the support for the electrically energizable heating unit. As shown in Figures 4 and 5, the primary yoke 30 is of channel or U-shaped configuration throughout its length and the resistance coating or layer 55 forming the heating element is applied throughout the inner surface of the bight portion 32 and the interior opposed surfaces of the side walls 34 of the member 30.

In order to establish a circuit and hence current flow through the resistance coating or layer 55 the inner surface of the bar 30 and the inner surfaces of the walls 34 are first given a coating of insulating varnish 53 or other suitable resin having electrical insulating characteristics. The coating 53 is best illustrated in Figures 5 and 6. The coating of insulating varnish or resin may be baked on the metal or may be air dried so as to become permanently bonded or cemented to the metal of the channel or primary yoke 30.

The coating or layer 55 of current-conducting high resistance material is then applied over the varnish coating 53. As shown in Figure 6 and by dotted or broken lines in Figure 4, the varnish coating terminates at the zones 57 so that the portions 58 of the bar 30 are uninsulated. The current conducting coating 55 is applied so that the end zones 58 of the bar or yoke 30 are coated and in direct contact with the current conducting material 55 so that a return circuit or ground connection is effected through the metal of bar 30 through the contact of the metal at the zones 58 with the current conducting coating.

In the embodiment illustrated in Figure 1, a circuit connection is made with the resistance unit, coating or layer 55 in the vicinity of the central zone of the yoke or bar 30. As insulated current conducting wire or lead 60 shown in Figures 1 and 3 extends through an insulating member 62 secured in any suitable manner to the bight portion of the channel shaped configuration of the yoke 30.

The terminus 64 of the metal portion of the conductor 60 adjacent the insulator 62 is soldered or otherwise joined with a small metal disc or button 66 which is in direct contact or engagement with the resistance coating 55 forming the heating element but is insulated from the metal of the yoke 30 by means of the insulation 62. The metal core of the insulated conductor 60 may be connected with a suitable switch 68 mounted upon the instrument panel 14 or other convenient portion of the vehicle. The switch may be manipulated by means of a member of knob 70. The other terminal of the switch mechanism 68 is connected by means of a conductor 72 with a source of electrical energy 74 which may be the storage battery of the vehicle or other suitable power source.

When the switch 70 is in a position to establish a circuit from the lead wire 72 to the conductor or lead wire 60, the current flows from the battery 74 through the lead 72, switch 68, lead or conductor 60, button 66 and through the current conducting coating 55 forming the heating element, the return circuit including the bar 30 through the end zones 58 and to the ground connection through the member 27, pin 28, member 23, rod 21 and arm 20 to the instrument panel or other metal portion of the vehicle which forms a part of the ground for the battery 74.

The insulating coating 53 in the channel configuration of the bar or yoke 30 may be in the form of a very thin sheet or layer of fabric formed of glass fibers or filaments, a thin sheet of mica or any other suitable insulating material which may be adhered or bonded to the metal of the bar 30.

The layer or coating 55 of electrical conducting material may be a composition including colloidal graphite, a metal powder and a suitable liquid vehicle or carrier for rendering the composition homogeneous and to facilitate the application of the material to a surface. The metal powder of the composition may be selected from a group including gold, silver, or aluminum, combined in the vehicle with colloidal graphite.

For example, a suitable ratio of silver powder to graphite has been found to be in the proportions of one-third graphite to two-thirds silver. This mixture may be varied from these proportions to a mixture of 50% graphite and 50% silver, depending upon the electrical resistance factors or characteristics desired in the composition. Alcohol has been found to be a satisfactory vehicle or carrier for the mixture of colloidal graphite and metal powder.

The composition forming the electrical resistance unit may be painted on or applied in the form of a single layer or may be applied in thin films applied successively, one upon the other. It has been found that to secure most satisfactory results, the resistance coating composition should be baked or dried by subjecting the coating or films to a temperature ranging from 350° to a maximum of 550° F.

The electrical resistance factor of the composition, when in the form of a film or coating on the surface, may be varied in several ways. The thickness of a single coating may be varied, or if successive films are applied, the number and thickness of the films may be varied to modify the electrical resistance characteristics. The resistance characteristics may also be modified by varying the proportions of metal powder and colloidal graphite in the composition.

It has been found that films or coatings forming the heating element from one-thousandths inch in thickness to twenty-thousandths inch in thickness provides the range of electrical resistance factors or characteristics which will facilitate the emission and transfer of heat from the resistance unit over a range of temperatures desired for operation of the windshield cleaner for varying degrees of cold encountered in different territorial regions. It has been found that a difference of a few thousandths of an inch in thickness will mean as much as 100° F. in the temperature ambient the zone of transfer or radiation of heat from the unit.

It has been found that for practical operating purposes, the resistance factor may be stabilized at three different values in order to produce sufficient heat providing ambient temperatures of, for example 225° F., 275° F. and 325° F. Thus in regions or territories where the winter temperatures are consistently below zero, a unit producing a higher degree of heat, as for example a unit providing 325° F. ambient temperature will be more satisfactory than one providing 275° F. ambient temperature.

From the foregoing, it will be apparent that the heating element is of negligible weight, is easy to apply and is capable of long life. It is of a character that can be readily applied or installed in any of the conventional type of windshield wiper or squeegee constructions employed for passenger cars, trucks, busses, aircraft, trains, watercraft, etc. without in any way altering or changing the design or construction of the squeegee or wiper devices.

If desired, a protective coating of varnish or paint may be applied over the electrical resistance layer or coating 55, but any such protective coating or paint should be extremely thin in order not to appreciably impair or interfere with the transfer or radiation of heat from the resistance unit 55 onto the glazed surface with which the assembly may be utilized.

The heating unit being carried by a metal wiper support or bar provides for the transfer of heat to the bar. When the heater is not in use as when the vehicle is parked, snow and ice may accumulate on the windshield wiper blade and the supporting bar and other components of the wiper mechanism so that the entire unit may be rendered immobile. When energy is applied to the heating element, the heat, through conduction and radiation, quickly melts any ice and snow collected on the various components of the windshield wiper so as to free the wiper for oscillation over the glazed surface or windshield. The water formed by the melting ice and snow flows over the glazed surface and assists in removing solid precipitation from the glazed surface. If the metal or supporting portion of the wiper construction is kept free of ice or snow, it has been found that much of the freezing condition on the windshield surface will be alleviated by the oscillatory movements of the ice-free wiper blade across the windshield surface. Furthermore, it has been found that a film of water flowing over the rubber section or squeegee of the wiper construction not only keeps the rubber section or squeegee free from ice and therefore flexible enough to function against the glass surface but tends to keep the surface of the windshield moist so that the formation of ice within the path of the moving or oscillating squeegee is prevented or eliminated.

The principles of the invention may be embodied or incorporated in a relatively stationary heating or deicing unit. Figures 7 through 9 inclusive illustrate a modified form of the invention wherein the electrical resistance heating unit may be affixed to a glazed surface or window for melting ice and snow in a zone adjacent the heating unit. Figure 7 illustrates a fragmentary portion of a vehicle including a windshield 10', a cowl portion 12', a top structure 80 and a portion of a vehicle door 81. A form of heating unit 84 is illustrated in a relatively stationary position adjacent a zone of the windshield 10'.

The unit in this form of the invention includes a generally U-shaped or channel-shaped member 86 formed of metal such as steel, aluminum, or other suitable metallic material or alloy. The interior surfaces of the central zone 88 and the parallel side walls 89 are first coated with a suitable insulating varnish 91 preferably of a resinous base which is baked on the metal at a suitable temperature.

Superposed on the varnish coating 91 is a coating or layer 93 of suitable current conducting material, having comparatively high resistance characteristics of the same character as the coating 55 shown in the form of the invention illustrated in Figure 1. The resistance coating or layer 93 may be applied by painting or flowing the composition over the varnish coating 91 so as to present a coating or layer of substantially uniform thickness throughout the coated zone of the member 88. The member 86 may, if desired, be of curved configuration in cross section without defined side walls.

It is highly essential for efficient operation of the heater in both forms of the device illustrated herein that the layer or coating of electrical resistance material be of substantially uniform thickness throughout its length in order to secure uniform heating and distribution of heat. The end zones of the metal member 88 may be formed with projecting portions 95 as shown in Figure 7 to which are secured rubber suction cups 97 or other supporting means. The suction cups 97 may be pressed against the glazed surface such as the windshield 10' or the glass of the door 81 or other glazed surface to secure the heating unit 84 in a stationary position adjacent the surface to which it is applied.

The unit is disposed with the resistance coating 93 adjacent the surface to be heated, the suction cups being of a dimension so that when they are applied to the glazed surface, the edges 90 of the walls 89 are slightly spaced from the surface. Thus by slightly spacing the edges 90 from the glazed surface, the water resulting from the melting ice and snow may flow freely over the glazed surface and assist in melting ice and snow in areas below the heating unit.

This form of heating or deicing unit requires a two wire conductor or circuit arrangement in order to establish current flow through the resistance coating 91. As shown diagrammatically in Figure 7, lead wires 98 and 99 are adapted to establish circuit connections for flow of electrical energy through the layer or coating of resistance material 93. The conductor or wire 98 is preferably connected with the resistance coating or heating element 93 at the central zone of the bar or member 88, the wire or conductor passing through an insulating member 62' of a character similar to the insulating member 62 illustrated in Figure 3, the member 62' preventing contact of the lead wire 98 with the bar 88.

The end zones of the metal bar 88 do not have a coating of varnish so that the heating element or coating 93 directly contacts or engages the metal of the bar 88 at the end zones in the same manner that the resistance coating 55 engages the metal of the end zones 58 of the bar 30 in the arrangement shown in Figures 4 and 6. The lead wire or conductor 99 is attached to the metal of the bar 88 and to a suitable ground connection (not shown) with a metal portion of the vehicle.

The lead wire or connector 98 is connected with a storage battery of the vehicle or other suitable source of electrical energy for completing a circuit through the resistance unit or coating 93. For example, the following arrangement may be employed for readily establishing a circuit to the lead wire 98. Most present day vehicles are equipped with a cigarette lighter which fits into or nests with a stationary socket associated with the vehicle instrument panel.

A circuit adaptor suitable for insertion in a socket of this character may be utilized, the adaptor being connected with the lead wire 98. Thus to establish current flow through the heating element 93, it is only necessary to insert such an adaptor in the socket on the instrument panel after removing the cigarette lighting unit or inserted in any suitable current supply socket. If desired, a suitable switch may be included in the circuit.

It has been found that other advantages accrue by installing the stationary heater arrangement of Figure 7 on the inside of a windshield in the path of an air stream, a defroster unit of the character conventionally used on motor vehicles and wherein the heater supporting means maintains the heater spaced a slight distance from the inner surface of the windshield. In a situation where snow or ice has accumulated on the windshield of a parked vehicle, the heater may be energized and the defroster air stream moving adjacent and around the heater unit warms the air. The warmed air flowing upwardly along the surface of the windshield heats the latter so that within a very short period of time the snow or ice accumulated on the windshield is melted and the water flows away or the snow and ice sufficiently softened whereby oscillation of the wiper mechanism quickly sweeps away the accumulated snow and ice. It is therefore desirable that the heating element be spaced a short distance from the glazed surface in order to foster or facilitate the movement of air between the heating unit and the glazed surface so that efficient transfer of heat to the moving air is assured.

While a single unit of this character is illustrated in Figure 7, it is to be understood that any number of units may be connected in parallel with a source of electrical energy to simultaneously apply heat to several regions of a glazed surface or to several surfaces. The arrangement may also be used on the side or rear windows of a vehicle or on train windows and windows in aircraft, watercraft, busses and the like.

As a practical example of structural arrangement of the device, I have found that the bar 88 may be formed of steel, aluminum, brass, copper or other suitable metal and of a length from about eight to twelve inches and about one inch in width. The side walls 89 may be of from three thirty seconds of an inch to one quarter inch in height to form the channel-shaped configuration or trough, the surface of which supports the layer or coating 93 of the heating unit.

The electrical resistance coating material may be applied in the same manner hereinbefore described in connection with the arrangement shown in Figures 1 through 6. It will also be apparent that the heater unit shown in Figures 7 through 9 may be used either on the interior or exterior of the glazed surface, but a higher ice or snow melting efficiency i. e. a more efficient radiation or transfer of heat from the unit to the ice or snow to be melted may be obtained by installation of the unit on the surface upon which the ice or snow may accumulate.

It will be apparent that the principles of the invention are equally applicable to both relatively movable and relatively stationary heating or deicing units. If desired, a layer of glass fiber cloth or thin sheet of mica may be used in lieu of the varnish coating 91 for insulating the resistance heating element or coating from the metal of the bar 88.

A feature of the invention which is particularly advantageous in the use of the heating element with a relatively movable window cleaner or squeegee is that the combined weight of the varnish or insulating coating and the resistance coating including that portion of the conductor 60 adjacent the arms 20 and 21 may be only a fraction of an ounce and has no appreciable effect on the oscillating or reciprocatory movement of the window cleaner or squeegee assembly.

The resistance heater may be prefabricated and bonded or joined to the wiper bar or mounting member in assembly. The high resistance, current conducting coating may be applied to a strip or sheet of insulating material such as glass fiber textile or high temperature resistant sheet fiber or to a comparatively thin metal strip coated with insulating varnish or other nonconducting material. Metal strips formed of Phosphor bronze aluminum or brass of a thickness of from about three thousandths inch to fifteen thousandths inch may be used. The preformed heating unit may be joined to the wiper bar or heater mounting means by an adhesive of varnish or other resin or by other suitable means.

It is apparent that, within the scope of the invention, modifications and different arrangements may be made other than is herein disclosed, and the present disclosure is illustrative merely, the invention comprehending all variations thereof.

I claim:

1. A combined windshield cleaner and deicing apparatus including a metal bar of channel-shaped configuration supporting a flexible windshield cleaning blade adapted to conform to the curved surface of said windshield, a coating of non-conductive material on the inner surface of the channeled area of the metal bar, a coating of current conducting material of comparatively high resistance bonded to said coating of non-conductive material, said non-conductive coating bonded to the inside surface of said channel member and extending short of one end of said channel member to provide an area at said end which is free from said non-conductive coating, said conductive coating being bonded to said non-conductive coating and extending to said one end of said channel member and bonded to said free area on the end of said channel member, an insulating bushing carried by the metal bar at a zone spaced from the region of contact of the metal bar with the current conducting material, and a current conductor extending through the bushing and connected to the layer of current conducting material for supplying electrical energy to the layer of current conducting material from a current source, the metal bar forming a part of the return circuit for the current conducting material to the current source.

2. A combined windshield cleaner and deicing apparatus including a metal bar of channel-shaped configuration supporting a windshield cleaning blade of flexible material which is adapted to conform to the curved surface of said windshield, a layer of insulating material on the inner channeled area of the metal bar, a layer of current conducting material of comparatively high resistance superposed on and bonded to said layer of insulating material, said insulating coating bonded to the inside surface of said channel member and extending short of the ends of said channel member to provide areas at said ends which are free from said insulating coating, said conductive coating being bonded to said insulating coating and extending to the ends of said channel member and bonded to said free areas on on the ends of said channel member, an insulating bushing carried by the metal bar at a zone spaced from the region of contact of the metal bar with the current conducting material, and a current conductor extending through the bushing and connected to the layer of current conducting material for supplying electrical energy to the layer of conductive material from a current source, the metal bar forming a part of the return circuit for the current conducting material to the current source, said current conducting material including a composition of metal powder and graphite.

References Cited in the file of this patent

UNITED STATES PATENTS

| | | |
|---|---|---|
| 2,179,566 | Stoekle | Nov. 14, 1939 |
| 2,679,569 | Hall | May 25, 1954 |

FOREIGN PATENTS

| | | |
|---|---|---|
| 311,167 | Great Britain | May 9, 1929 |